Patented Dec. 2, 1930

1,783,584

UNITED STATES PATENT OFFICE

GUSTAV REDDELIEN, OF LEIPZIG, AND HANS LANGE AND HUGO PFANNENSTIEL, OF DESSAU IN ANHALT, GERMANY, ASSIGNORS TO WINTHROP CHEMICAL COMPANY, INC., OF NEW YORK, N. Y., A CORPORATION OF NEW YORK

MANUFACTURE OF AROMATIC HYDROXYALDEHYDES

No Drawing. Application filed June 27, 1928, Serial No. 288,802, and in Germany July 30, 1927.

The invention relates to a new process of manufacture of hydroxyarylaldehydes and is based on the observation that isatin and its derivatives may be used for converting into valuable hydroxyaldehydes hydroxyaralkylamines, the technical manufacture of which is possible by the process described in U. S. application Ser. No. 96,870 filed March 23rd 1926.

It is known (Traube, Ber. d. d. chem. Ges. vol. 44, page 3145) that when benzylamine is boiled with alloxan or isatin benzaldehyde is produced. Langenbeck (Ber. vol. 60, page 931) investigated the action of isatin and its derivatives on amino-acids and found that these substances act as dehydrogenating catalysts.

The hydroxyaralkylamines in free condition are solids and cannot be subjected to the process of Traube loc. cit. It could not be foreseen that the reaction would occur with hydroxyaralkylamines in aqueous alkaline solution, since these bases in free condition are in part extremely unstable; for instance vanillylamine is decomposed even by hot water. The novel observation that boiling feebly alkaline aqueous solutions of hydroxyaralkylamines with isatin or its derivatives produce smooth formation of aldehyde is surprising. The oxidation may be produced either by using for one molecular proportion of amine two molecular proportions of the isatin or a derivative thereof, whereby a direct oxidation to aldehyde occurs with formation of isatyd, or with an insufficient proportion of isatin, air being conducted through the solution during the boiling operation, whereby the isatin acts as a catalyst. The isatyd formed is continuously further oxidized to isatin by the atmospheric oxygen, and the isatin converts a further quantity of amine into the aldehyde.

The following examples illustrate the invention, the parts being by weight:—

*Example 1.*—Into a reflux apparatus there are introduced 122 parts of ortho-hydroxybenzylamine, 5000 parts of water, 2.3 parts of caustic soda lye of 40° Bé. and 284 parts of potassium isatin-5-sulphonate. The mixture is boiled while air is passed through it. When the reaction is complete the product is distilled with steam, whereby ortho-salicylic aldehyde passes over in good yield. It is separated and distilled. The yield is 60 per cent. of the theoretical. The reaction is represented by the following equation:

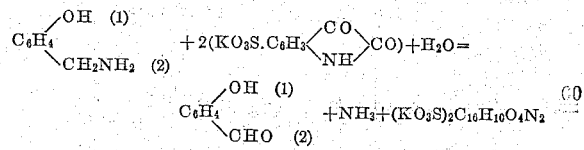

*Example 2.*—47,5 parts of vanillylamine hydrochloride are dissolved in 2500 parts of water, 13.5 parts of sodium carbonate are added, and the whole is boiled with 156 parts of potassium isatin-5-sulphonate for 2 hours in a reflux apparatus. After cooling, the mixture is acidified and extracted with chloroform. A yield of 70 per cent. of the theoretical of vanillin is obtained. The reaction is represented by the following equation:

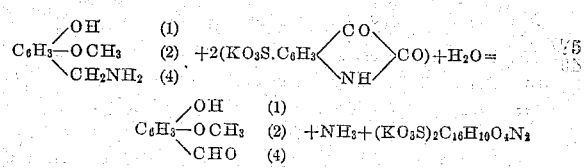

*Example 3.*—47,5 parts of vanillylamine hydrochloride are dissolved in 2500 parts of water, and there are added 13.5 parts of sodium carbonate and 28 parts of potassium isatin-5-sulphonate; the whole is boiled in a reflux apparatus for 24 hours, while passing air through it. By acidifying the cooled mixture and extracting it with chloroform, vanillin is obtained in a yield of 42 per cent. of the theoretical. The reaction is the same as that in Example 2.

If isatin is substituted for the potassium isatin-5-sulfonate vanillin is also obtained.

*Example 4.*—47,5 parts of vanillylamine hydrochloride are dissolved in 2500 parts of water, and there are added 13.5 parts of sodium carbonate. The solution is boiled for 4 hours with 74 parts of isatin. The mixture is acidified, filtered and extracted with chloroform. By this manner vanillin and isatin are extracted from the solution; the solvent is removed by distillation and the residue is distilled with steam under a diminished pressure. A yield of pure vanillin of 45 per cent. of the theoretical is obtained. The reaction is represented by the following equation:

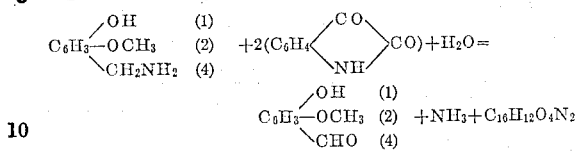

*Example 5.*—9 parts of 5-(ω-aminomethyl)-1:2:3-ortho-cresotinic acid are dissolved in 500 parts of water and 5.7 parts of caustic soda lye of 40° Bé. 14.2 parts of potassium isatin-5-sulphonate are added, and the whole is boiled in the reflux apparatus for 2 hours, while air is passed through it. By acidifying the solution 5-aldehyd-1:2:3-ortho-cresotinic acid is precipitated. The yield is 77 per cent. of the theoretical. The reaction is represented by the following equation:

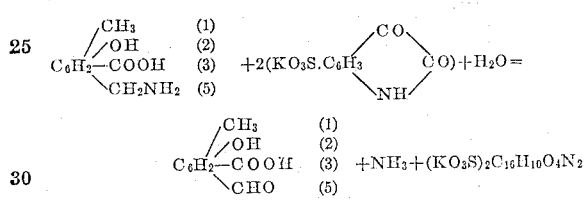

The equations given in the examples relate to processes in which one molecular proportion of a hydroxyaralkylamine reacts with two molecular proportions of an isatin compound. As mentioned above, however, it is not necessary to apply the reacting compounds in the ratio 1:2. The isatin compound may be used in a smaller quantity as required; in this case the isatyd formed is continuously oxidized to isatin converting a further quantity of amine into aldehyde.

What we claim is:—

1. A process of manufacturing aromatic hydroxyaldehydes by treating hydroxyaralkylamines with a compound containing the general nucleus:

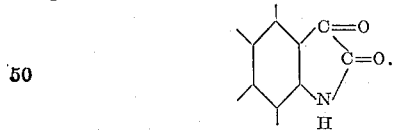

2. A process of manufacturing aromatic hydroxyaldehydes by treating hydroxyaralkylamines with a compound containing the general nucleus:

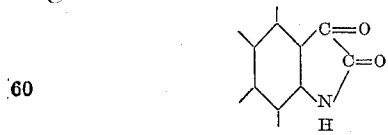

whilst blowing air through the reacting solution.

3. A process of manufacturing aromatic hydroxyaldehydes by treating hydroxyaralkylamines in an aqueous solution with an alkali salt of isatin-5-sulphonic acid.

4. A process of manufacturing aromatic hydroxyaldehydes by treating hydroxyaralkylamines in an aqueous solution with an alkali salt of isatin-5-sulphonic acid whilst blowing air through the solution.

5. A process of manufacturing vanillin by treating vanillylamine with a compound containing the general nucleus:

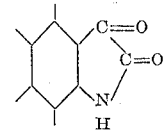

6. A process of manufacturing vanillin by treating vanillylamine with a compound containing the general nucleus:

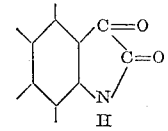

whilst blowing air through the reacting solution.

7. A process of manufacturing vanillin by treating vanillylamine in an aqueous solution with an alkali salt of isatin-5-sulphonic acid.

8. A process of manufacturing vanillin by treating vanillylamine in an aqueous solution with an alkali salt of isatin-5-sulphonic acid whilst blowing air through the solution.

In testimony whereof, we affix our signatures.

GUSTAV REDDELIEN.
HANS LANGE.
HUGO PFANNENSTIEL.